UNITED STATES PATENT OFFICE.

LOUIS LUDOVICI AND LOUIS LUDOVICI, JR., OF NEW YORK, ASSIGNEES OF MORIZ NOWAK.

IMPROVED BLASTING COMPOUND.

Specification forming part of Letters Patent No. 42,869, dated May 24, 1864; antedated March 8, 1863; Reissue No. 2,214, dated March 27, 1866.

*To all whom it may concern:*

Be it known that NORIZ NOWAK, of the city, county, and State of New York, did invent a new and Improved Blasting Compound; and we, LOUIS LUDOVICI and LOUIS LUDOVICI, Jr., assignees of said NOWAK, do hereby declare that the following is a full, clear, and exact description thereof, which will enable those skilled in the art to make and use the same.

This invention relates to a compound in which ferro-cyanide of potash is rendered available for the manufacture of blasting-powder, and is used particularly when applied to vegetable materials of any description, such as leaves from trees, sawdust, waste cotton, or paper.

For the purpose of manufacturing this water-tight blasting-paste all vegetable materials can be used. It is most convenient to employ ordinary blotting-paper. This material is saturated with a solution of the hereinafter-named materials, mixed together in about the following proportions: binoxide of manganese, ($MnO_2$) twenty-three grams, or, instead thereof, carbon (C) fifteen grams; chlorate of potash, ($ClO_5KO$,) sixty-two grams; nitrate of potash, ($NO_5KO$,) thirty-one grams; ferro-cyanide of potash, ($2KCyFeCy\&_3HO$,) fifteen grams. These ingredients are dissolved in about four quarts of pure water and boiled for about half an hour until all the ingredients are perfectly dissolved, and then is added half a tea-spoonful of starch, ($C_{12}H_{10}O_{10}$,) dissolved in a small quantity of water, for the purpose of binding together the other ingredients, and the boiling of the mass is discontinued. If desired, a small quantity of sugar may be added. Finally, fifteen grams of bichromate of potash ($2CrO_3KO$) are dissolved in a small quantity of water, and of this solution from one to two tea-spoonfuls are added to the boiling mass. Thus prepared, the solution is ready, and the linen fabric, cotton waste, paper, or other vegetable material is saturated with it and then carefully dried. If paper is used, the satuated paper, when dry, is rolled up in the shape of cigars to the desired thickness—for instance, three-quarters to one inch thick and four to six inches long—and then surrounded by a strip of common paper, which is fastened with gum. But in case sawdust, cotton waste, or other similar material has been satuated with the solution, said material is filled into paper cylinders previously prepared for that purpose, and ignited by means of a fuse or by metal wire and electricity. In order to render these cartridges water-tight, they are covered with a varnish prepared as follows: tar, four parts; resin, one part; burned but unslaked lime, one part. These ingredients are carefully worked together in a water bath and the mixture applied to the cartridges, and if asphaltum can be had it may also be used with advantage in the above mixture. The coat of varnish is finally covered with the residuum of ordinary varnishes, which renders the cartridges perfectly water-tight.

The power of this "blasting pasta" is much greater than that of ordinary blasting-powder. It can be used with advantage for the purpose of blasting rocks under water or in wet mines, it is not liable to explode spontaneously, it can be manufactured without danger, and it can be transported with perfect safety.

We claim as new and desire to secure by Letters Patent—

1. The combination of chlorate of potash, nitrate of potash, and ferro-cyanide of potash with each other and with a substance capable of evolving gases, such as carbon or equivalent materials, substantially as and for the purpose described.

2. The combination of chlorate of potash, nitrate of potash, and ferro-cyanide of potash with binoxide of manganese, substantially as and for the purpose set forth.

3. The use of bichromate of potash, in combination with chlorate of potash, nitrate of potash, and ferro-cyanide of potash, substantially as and for the purpose described.

4. The application of a solution of chlorate of potash, nitrate of potash, and ferro cyanide of potash to paper or other vegetable materials capable of being formed into cartridges and protected by some water-tight compound—such, for instance, as that above specified—for the purposes set forth.

The above specification of said invention signed by us this 16th day of January, 1866.

L. LUDOVICI.
LOUIS LUDOVICI, JR.

Witnesses:
W. HAUFF,
M. M. LIVINGSTON.